United States Patent [19]

Shephard

[11] 3,714,141

[45] Jan. 30, 1973

[54] PROCESS FOR MAKING 7-HALOLINCOMYCINS

[75] Inventor: Kenneth P. Shephard, Portage, Mich.

[73] Assignee: The Upjohn Company, Kalamazoo, Mich.

[22] Filed: May 26, 1970

[21] Appl. No.: 40,724

[52] U.S. Cl. ............................................. 260/210 R
[51] Int. Cl. ............................................. C08b 19/00
[58] Field of Search ................................ 260/210 R

[56] References Cited

UNITED STATES PATENTS 3,435,025   3/1969   Birkenmeyer ..................... 260/210 R
3,496,163   2/1970   Birkenmeyer et al. ............. 260/210 R
3,509,127   4/1970   Kagan et al. ...................... 260/210 R
3,574,186   4/1971   Birkenmeyer et al. ............. 260/210 R

*Primary Examiner*—Lewis Gotts
*Assistant Examiner*—Johnnie R. Brown
*Attorney*—Roman Saliwanchik and John Kekich

[57] ABSTRACT

7-Halo-7-deoxylincomycin and analogs thereof are prepared by reacting a lincomycin with thionyl chloride to form a lincomycin 3,4-O-cyclic sulfite, then with Rydon reagent to form a 7-halo-7-deoxylincomycin 3,4-O-cyclic sulfite, and removing the 3,4-O-cyclic sulfite group by hydrolysis.

6 Claims, No Drawings

PROCESS FOR MAKING 7-HALOLINCOMYCINS

BRIEF DESCRIPTION OF THE INVENTION

The invention relates to a process for the preparation of 7-halo-7-deoxylincomycin and analogs thereof and is directed to a process in which lincomycin or an analog thereof of the formula

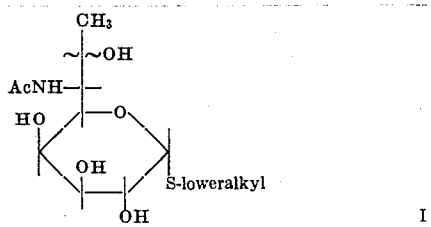

is reacted first with thionyl chloride to form a 3,4-O-cyclic sulfite of the formula

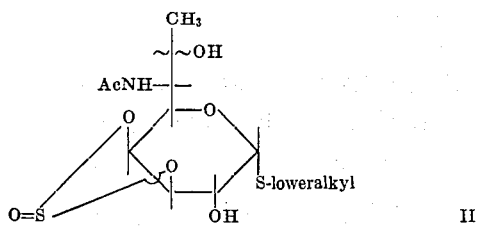

then with Rydon reagent to form a 3,4-O-cyclic sulfite of the formula

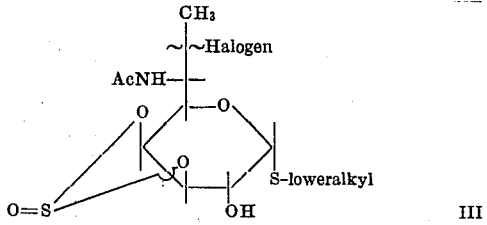

and then removing the 3,4-O-cyclic sulfite group by hydrolysis to form a compound of the formula

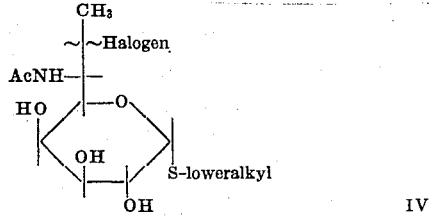

Ac in the process can be hydrogen or carboxacyl, for example, the L-2-pyrrolydinecarboxacyl moiety of lincomycin or an analog thereof as described, for example, in U.S. Pat. No. 3,496,163, or any other carboxyacyl group.

BACKGROUND

7(S)-Chloro-7-deoxylincomycin has been prepared heretofore by using thionyl chloride as the chlorinating agent. A large excess of thionyl chloride was necessary, however, because the thionyl chloride first attached the 3,4-hydroxy groups to form a 3,4-O-cyclic sulfite, then the 7-O-hydroxy to form a 7-chloro group, and then the 2-hydroxy to form a bis-sulfite. The yields are low especially when Ac is hydrogen.

7-Chloro-7-deoxylincomycin and analogs thereof as well as the corresponding bromo derivatives have been prepared by reacting lincomycin with Rydon reagent and while this process was more efficient than the thionyl chloride process, and worked better when Ac is hydrogen, it still gives relatively inferior yields.

In the Rydon reagent process as more fully described in Belgian Pat. No. 676,202 [U.S. application Ser. No. 498,989, filed Oct. 20, 1965 (1980A)]0 and U.S. Pat. No. 3,475,407 (2363) and in U.S. Pat. No. 3,496,163 (1980A-3), several variant processes can be used. In one triphenylphosphine is reacted with chlorine or bromine to form a triphenylphosphonium dihalide. In another the triphenylphosphine is replaced by triphenyl phosphite. In another triphenylphosphine is reacted with an alkyl halide. In another the starting material is reacted with a mixture of triphenylphosphine and a carbon tetrahalide corresponding to the halogen that one wants to introduce. This latter process also is effective to introduce iodine.

DETAILED DESCRIPTION

In carrying out the process of the invention the starting material of formula I is reacted with thionyl chloride under conditions such that only the 3-, and 4-O hydrogens are replaced resulting in the formation of a 3,4-O-cyclic sulfite of formula II. The optimum conditions obtain when the stoichiometric amount of thionyl chloride is reacted with the starting compound in an inert solvent without heating, advantageously with cooling to about between about $-5°$ and $+5°$ C. More thionyl chloride can be used, of course, but an excess is undesirable. Suitable inert solvents include acetonitrile and methylene chloride.

Advantageously the thionyl chloride reaction is effected with anhydrous materials. Otherwise the amount of thionyl chloride must be increased in proportion to the amount of water present. Commercial lincomycin hydrochloride contains a mole of water. If this is used, the amount of thionyl chloride must be increased accordingly. Also additional thionyl chloride must be used if the solvents and reagents contain water. It is therefore of advantage to use anhydrous materials.

A further unexpected advantage results from the use of anhydrous material. For reasons not entirely clear, the second step in the process does not proceed well if lincomycin hydrochloride monohydrate is used unless part of the hydrogen chloride is neutralized before the second step is carried out. This can be accomplished by neutralizing the hydrogen chloride with an ammonium base or quaternary ammonium base ion exchanger or by adding an ammonium base, for example diethylamine, triethylamine or pyridine. The amount of base can be varied widely but best results have been obtained when one equivalent of base is used. This is about ¼ the stoichiometric amount as two equivalents of hydrogen chloride are liberated in forming the 3,4-O-cyclic sulfite and two in the reaction with water of crystallization.

The 3,4-O-cyclic sulfite thus obtained is then reacted with a Rydon reagent. This can be any of the variants mentioned above but advantageously is the last one, that is, the one using a mixture of triphenylphosphine and carbon tetrahalide. To effect this step all that is necessary is to mix the starting 3,4-O-cyclic sulfite (formula II), triphenylphosphine and carbon tetrahalide in an inert solvent. An excess of the carbon tetrahalide can advantageously be used as the inert solvent or as a part thereof. Other such solvents, however, are acetonitrile and dimethylformamide.

It is of advantage to use a substantial excess each of the triphenylphosphine and the carbon tetrahalide. A three fold excess of triphenylphosphine is good but more or less, say 2 to 5, can be used. An even larger excess of carbon tetrahalide is good because of its solvent action. Advantageously acetonitrile and carbontetrahalide in substantially equal volumes is used as the solvent.

It is not necessary to isolate the 3,4-O-cyclic sulfite formed in the first step. It is sufficient simply to add the triphenlphosphine and carbon tetrahalide to the reaction mixture.

The reaction with triphenylphosphine and carbon tetrahalide is exothermic. Care therefore should be exercised to avoid excessive heating. It is sometimes desirable to cool the reaction to the temperature between about 5° C. and 25° C. Higher or lower temperatures can be used, however, up to about 40° C. or so.

The resulting product, compound of formula III, is then hydrolyzed to give the desired product. The hydrolysis can be effected by heating with water or by simply contacting the material to be hydrolized with dilute alkali. Either before or after the hydrolysis, the unreacted triphenylphosphine and the triphenylphosphine oxide reaction product can be removed. Any of the standard isolation techniques can be used.

Advantageously the reaction mixture is first diluted with methanol to decompose any triphenylphosphinedichloride present and either distilled or simply dilute with water and recover the aqueous phase. It is then adjusted to pH 7-8 or so with sodium hydroxide an aqueous medium and the desired product recovered by crystallization or other standard methods.

The invention can be more fully understood by reference to the following examples in which the parts are by weight unless otherwise specified.

EXAMPLE 1

Part A-1: 7(S)-Chloro-7-deoxylincomycin-3,4-O-cyclic sulfite hydrochloride

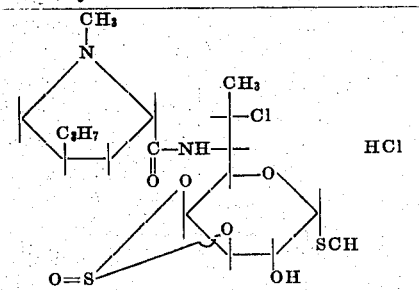

Lincomycin hydrochloride monohydrate (50.0 g.) was added portionwise over a period of 25 minutes to a solution of 50 ml. of thionyl chloride in 75 ml. of methylene chloride which was stirred with cooling in an ice bath. After the addition was completed the solution was stirred for 15 minutes and then 60 ml. of methylene chloride was added. The resulting solution was stirred for an additional 5 minutes and then added slowly through an addition funnel to 2 l. of Skellysolve B (technical hexane) with efficient stirring. Lincomycin-3,4-O-cyclic sulfite precipitated as a white solid. The white solid was filtered off and washed well with Skellysolve B.

The white solid was added to a solution of 500 ml. of acetonitrile, 500 ml. of carbon tetrachloride and 120.0 g. of triphenylphosphine which was stirred with cooling in an ice-acetone bath. The resulting solution was stirred for 22 hours (no additional ice was added to the cooling bath). The reaction mixture was stirred with 100 ml. of methanol for 10 minutes and then evaporated to dryness under vacuum in a 50°-60° C. water bath.

Part B-1: 7(S)-Chloro-7-deoxylincomycin Hydrochloride

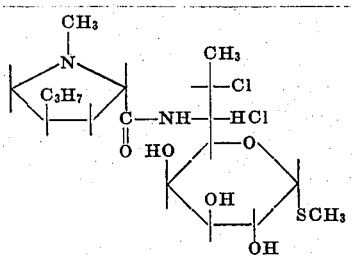

The residue (Part A-1) was shaken with 1 l. of water until all the syrup had dissolved and a light tan solid was in suspension. The suspension was filtered and the filtrate was made a pH of 11 with 50 percent aqueous sodium hydroxide. The basic suspension was extracted with one 325 ml. portion and three 50-ml. portions of methylene chloride. The methylene chloride extracts were combined and dried over anhydrous magnesium sulfate. The dry methylene chloride solution was evaporated to dryness under vacuum in a 50°-60° C. water bath. The residue was dissolved in 80 ml. of ethanol with warming and then 260 ml. of ethyl acetate was added. This solution was made a pH of 1 with saturated ethanolic HCl. Crystallization began immediately and the mixture was cooled at 0° C. for 18 hours.

The cold crystallization mixture was filtered and the solid was dried under vacuum at 60° C. to give 47.7 g. of 7(S)-chloro-7-deoxylincomycin hydrochloride as the ethanol solvate.

A mixture of 47.7 g. of 7(S)-chloro-7-deoxylincomycin hydrochloride ethanol solvate, 34 ml. of water, and 95 ml. of acetone was heated to 53° C. To this solution was added with stirring 1335 ml. of acetone which had been heated to 53° C. The resulting solution was seeded immediately with crystals of 7(S)-chloro-7-deoxylincomycin hydrochloride and stirred without heating for 21 hours. The crystallization mixture was then cooled to 19° C. and filtered. The solid was air dried in the hood to give 38.1 g. of 7(S)-chloro-7-deoxylincomycin hydrochloride having the following characteristics:

$[\alpha]_D$ +143°
Analysis:
Calcd. for $C_{18}H_{33}ClN_2O_5S \cdot HCl$: C, 46.85; H, 7.43; N, 6.07; S, 6.95; Cl, 15.37.
Found (Corrected for 4.02% water): C, 46.75; H, 7.34; N, 6.20; S, 6.90; Cl, 15.36.
Equivalent Weight: Calcd. 461
Found 460.

EXAMPLE 2

Part A-2: 7(S)-Chloro-7-deoxylincomycin-3,4-O-Cyclic sulfite Hydrochloride

Lincomycin hydrochloride monohydrate (50.0 g.) was added slowly over a period of 35 minutes to 150 ml. of thionyl chloride which was cooled in an ice-acetone bath. After addition was complete, the resulting solution was stirred for 15 minutes in an ice-acetone bath and then poured slowly into 2000 ml. of ether with efficient stirring. The lincomycin-3,4-O-cyclic sulfite precipitated as a white solid. The white solid was filtered off, washed well with ether. The white solid was placed in 3 l. flask containing 500 ml. of acetonitrile. This mixture was stirred in an ice bath while 500 ml. of carbon tetrachloride and 120.0 g. of triphenylphosphine were added. The reaction mixture was then stirred for 16 hours (no additional ice was added to the cooling bath). The reaction mixture was evaporated to dryness under vacuum in a 50°–60° C. water bath. The residue was dissolved in 1 l. of methanol and refluxed for 80 minutes. The solution was then evaporated to dryness under vacuum in a 50°–60° C. water bath.

Part B–2: 7(S)-Chloro-7-deoxylincomycin Hydrochloride

The residue of Part A–2 was shaken with 1 l. of water until all the oil had dissolved and a tan solid was in suspension. The suspension was filtered and the filtrate was made a pH of 11 with 6N sodium hydroxide. The basic solution was made a pH of 1 with 10 percent hydrochloric acid and the granular substance which formed was filtered off. The acidic solution was made a pH of 11 with 6N sodium hydroxide and extracted with one 300-ml. portion and three 150-ml. portions of chloroform. The combined chloroform extracts were dried over anhydrous magnesium sulfate. The solution was then evaporated to dryness under vacuum in a 50°–60 C. water bath. The residue was dissolved in 80 ml. of ethanol with warming and then 250 ml. of ethyl acetate was added. The solution was made a pH of 1 with saturated ethanolic HCl. Crystallization began immediately and the mixture was left at room temperature for 30 minutes and then cooled at 0° C. for 18 hours. The cold crystallization mixture was filtered and the solid was dried under vacuum at 60° C. for 7 hr. The dried 7(S)-chloro-7-deoxylincomycin hydrochloride weighed 44.3 g. and exists as an ethanol solvate.

EXAMPLE 3

Thionyl chloride (17 ml.) was added dropwise to a mixture of 50.0 g. of lincomycin hydrochloride monohydrate and 50.0 ml. of acetonitrile which was stirred with cooling in an ice bath. The resulting solution was stirred with cooling for 15 minutes and then 35 ml. of diethylamine was added dropwise with stirring keeping the temperature below 5° C. After the addition was completed the ice bath was removed and the temperature was allowed to rise to 11° C. To this cold solution was added 120 g. of triphenylphosphine and 400 ml. of carbon tetrachloride with stirring. The reaction mixture warmed up from 11° C. to 45° C. over a period of 10–15 minutes. The reaction mixture was then stirred for 4 hours at 40° C.

The reaction mixture was stirred with 20 ml. of methanol for 10 minutes and then evaporated to dryness under vacuum in a 50°–60° C. water bath. The residue was shaken with 800 ml. of water until all the syrup had dissolved and a white solid was in suspension. The suspension was filtered and the filtrate was made a pH of 11 with 50 percent aqueous sodium hydroxide. This basic suspension was extracted with one 325-ml. portion and three 50-ml. portions of methylene chloride. The methylene chloride extracts were combined and evaporated to dryness under vacuum in a 50°–60 C. water bath. The residue was shaken with 800 ml. of water and 20 ml. of 37 percent hydrochloric acid until all the syrup had dissolved and an orange solid was in suspension.

The suspension was filtered and the filtrate was made a pH of 11 with 50 percent aqueous sodium hydroxide. The basic mixture was extracted with one 350-ml. portion, one 100-ml. portion and two 60 ml.-portions of carbon tetrachloride. Sodium chloride (150 g.) was added to the water layer which was then extracted with three 60-ml. portions of carbon tetrachloride. The carbon tetrachloride extracts were combined and dried over anhydrous magnesium sulfate. The water layer was saturated with sodium chloride and extracted with two 50-ml. portions of methylene chloride. The methylene chloride extracts were dried over anhydrous magnesium sulfate. The methylene chloride solution was evaporated to dryness to give 4.0 g. of a non-crystalline solid. The dry carbon tetrachloride solution from above was evaporated to dryness under vacuum in a 50°–60° C. water bath. The residue was dissolved in 75 ml. of ethanol with warming and then 260 ml. of ethyl acetate was added. This solution was made a pH of 1 with saturated ethanolic HCl. Crystallization began immediately and the mixture was cooled at 0° C. for 2 hours and then filtered. The solid was dried under vacuum at 45° C. to give 42.4 g. of 7(S)-chloro-7-deoxylincomycin hydrochloride as an ethanol solvate.

A mixture of the 42.4 g. of 7(S)-chloro-7-deoxylincomycin hydrochloride ethanol solvate, 30 ml. of water, and 85 ml. of acetone was heated to 55° C. This solution was added with stirring to 1190 ml. of acetone which had been heated to 55° C. The resulting solution was seeded immediately and stirred without further heating for 21 hours. The crystallization mixture was cooled at 10°–15° C. for 2 hours and then filtered. The solid was air dried in the hood to give 36.0 g. of 7(S)-chloro-7-deoxylincomycin hydrochloride having the following characteristics:

$[\alpha]_D$ +143°

Analysis:
Found (Corrected for 4.20% water): C, 46.86; H, 7.24; N, 5.84; S, 7.02; Cl, 15.57.
Equivalent weight: Found 461

EXAMPLE 4

7(S)-Chloro-7-deoxylincomycin Hydrochloride from Anhydrous lincomycin Hydrochloride Thionyl chloride (9.5 ml.) was added dropwise with stirring to a mixture of 48 g. of unmilled anhydrous lincomycin hydrochloride and 500 ml. of acetonitrile which was kept below 5° C. by cooling in an ice bath. The resulting mixture was stirred at 0°–5° C. for 25 minutes and then the ice bath was removed. To this solution was added a solution of 120 g. of triphenylphosphine in 500 ml. of carbon tetrachloride. The temperature of the reaction mixture rose from 5° C. to 35° C. over a period of 15–20 minutes. The reaction mixture was then stirred at room temperature for 16 hours and treated by (a) or (b) as follows:

a. The reaction mixture was stirred with 30 ml. of methanol for 10 min. and then evaporated to near dryness under vacuum in a 50°–60° C. water bath. The residue was shaken with 800 ml. of water until all the syrup had dissolved and a tan solid was in suspension. The suspension was filtered and the filtrate was made a pH of 11 with 50 percent aqueous sodium hydroxide. This basic mixture was extracted with one 325 ml.-portion and three 50-ml. portions of methylene chloride. The methylene chloride extracts were combined, dried and evaporated to near dryness under vacuum in a 50°–60 C. water bath. The residue was shaken with 700 ml. of water and 25 ml. of 37 percent hydrochloric acid. This mixture was extracted with one 250-ml. portion and two 100-ml. portions of carbon tetrachloride. The aqueous layer (1200 ml.) was treated with charcoal, filtered and added to 200 g. of sodium chloride. This solution was made a pH of 11 with 50 percent aqueous sodium hydroxide and then 325 ml. of methylene chloride was added. The pH of this mixture was adjusted to 6.35 with stirring.

b. The reaction mixture was stirred with 30 ml. of methanol for 10 min. and then diluted with 300 ml. of water. Sodium hydroxide (50 percent aqueous) was added to pH 10.8 and resulting mixture was stirred for five minutes. The pH was then adjusted to 8.5 with conc. hydrochloric acid. After stirring for five minutes, the organic and aqueous phases were separated. The organic phase was acidified with 15 ml. conc. hydrochloric acid and concentrated under vacuum to a thick slurry. This slurry was then slowly diluted with 700 ml. water while distilling under vacuum for a period of 1 hour. After cooling overnight, the mixture was filtered and the cake washed well with water. The filtrate, including the wash water, was treated with 100 gr. sodium chloride and 325 ml. methylene chloride. The pH was adjusted to 6.35 by addition of sodium hydroxide (50 percent aqueous).

The methylene chloride layer of either a) or b) was separated and this procedure (adding methylene chloride and adjusting the pH to 6.35) was repeated with four 100-ml. portions of methylene chloride. The methylene chloride extracts were combined and dried over anhydrous magnesium sulfate and evaporated to near dryness under vacuum in a 50°–60° C. water bath. The residue was dissolved in 70 ml. of ethanol and 260 ml. of ethyl acetate. This solution was made a pH of 1 with saturated ethanolic HCl and cooled at 0° C. for 1 hour. The solids were filtered, washed with ethyl acetate, dried under vacuum at 50° C. for 18 hours (48.0 g.) and air dried for days to give 46.5 g. of 7(S)-chloro-7-deoxylincomcyin hydrochloride.

A mixture of the 46.5 g. of 7(S)-chloro-7-deoxylincomycin hydrochloride, 33 ml. of water, and 95 ml. of acetone was heated to 54° C. This solution was added with stirring to 1300 ml. of acetone which had been heated to 54° C. The resulting solution was seeded immediately and stirred without further heating for 20 hours. The crystallization mixture was cooled at 0° C. for 2 hours and then filtered. The product was washed with acetone and then air dried in the hood to give 42.1 g. of 7(S)-chloro-7-deoxylincomycin hydrochloride hydrate having essentially the same characteristics as the products of Examples 1 and 3.

I claim:

1. A process for making 7-halo lincomycins which comprise reacting a compound of the formula

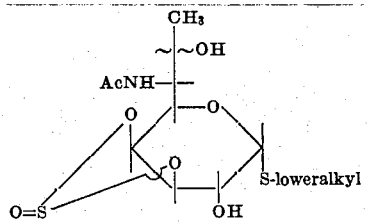

with Rydon reagent to form a compound of the formula

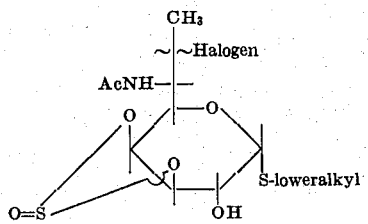

wherein Ac is hydrogen or carboxacyl and removing the 3-,4-O-cyclic sulfite group by hydrolysis, Halogen being chlorine or bromide.

2. The process of claim 1 in which the Rydon reagent is a mixture of triphenylphosphine and carbon tetrachloride.

3. The process of claim 1 in which Ac is an L-2-pyrrolidinecarboxacyl.

4. The process of claim 2 in which Ac is an L-2-pyrrolidinecarboxacyl.

5. The process of claim 1 in which alkyl is methyl and Ac is N-methyl-4-propyl-L-2-pyrrolidinecarboxacyl.

6. The process of claim 2 in which alkyl is methyl and Ac is N-methyl-4-propyl-L-2-pyrrolidinecarboxacyl.

* * * * *